United States Patent
Schulz et al.

(10) Patent No.: US 7,146,003 B2
(45) Date of Patent: Dec. 5, 2006

(54) NOISE LEVEL CALCULATOR FOR ECHO CANCELLER

(75) Inventors: Dieter Schulz, Dunrobin Shores (CA); Renee Johnston, Ottawa (CA)

(73) Assignee: Zarlink Semiconductor Inc. (CA)

(*) Notice: Subject to any disclaimer, the term of this patent is extended or adjusted under 35 U.S.C. 154(b) by 556 days.

(21) Appl. No.: 09/965,881

(22) Filed: Sep. 28, 2001

(65) Prior Publication Data

US 2002/0039415 A1   Apr. 4, 2002

(30) Foreign Application Priority Data

Sep. 30, 2000   (GB) .................................... 0023975

(51) Int. Cl.
 *H04M 9/08* (2006.01)
(52) U.S. Cl. .................. 379/406.01; 379/406.02; 379/406.03; 379/406.04; 379/406.05; 379/406.06; 379/406.08; 379/406.09
(58) Field of Classification Search ............................... 379/406.01–406.16
See application file for complete search history.

(56) References Cited

U.S. PATENT DOCUMENTS

| | | | |
|---|---|---|---|
| 5,764,753 A | | 6/1998 | McCaslin et al. |
| 5,771,486 A | * | 6/1998 | Chan et al. ............... 704/200 |
| 6,175,634 B1 | * | 1/2001 | Graumann ................ 381/94.1 |
| 6,282,286 B1 | | 8/2001 | Ressor et al. |
| 6,658,380 B1 | | 12/2003 | Lockwood et al. |

FOREIGN PATENT DOCUMENTS

| | | |
|---|---|---|
| DE | 69803202 | 8/2002 |
| EP | 0140249 | 5/1985 |
| GB | 2330745 | 4/1999 |
| WO | 9602911 | 2/1996 |
| WO | WO 9914737 | 3/1999 |

OTHER PUBLICATIONS

WO 9602911A1: Reaves et al ,"Speech Detection Device"; Pub. Feb. 1, 1996; WO.*
Office Action from German Patent Office dated Aug. 1, 2003 with English translation.

* cited by examiner

*Primary Examiner*—Fan Tsang
*Assistant Examiner*—Ramnandan Singh
(74) *Attorney, Agent, or Firm*—Jones Day

(57) ABSTRACT

A noise level calculator for detecting noise in a telephone line echo canceller that utilizes adaptive filters enables silencing of noise switching so that it is not heard on the far end side. The calculator promotes determining whether the reference signal applied to the adaptive filter is a noise or non-noise segment. The calculator operates by calculating the difference in energy of two sample windows, calculating the difference in the energy of the signal within each of the sample windows, updating a variance parameter based on the difference, and performing further alternative operations based on the value of the variance parameter.

3 Claims, 3 Drawing Sheets

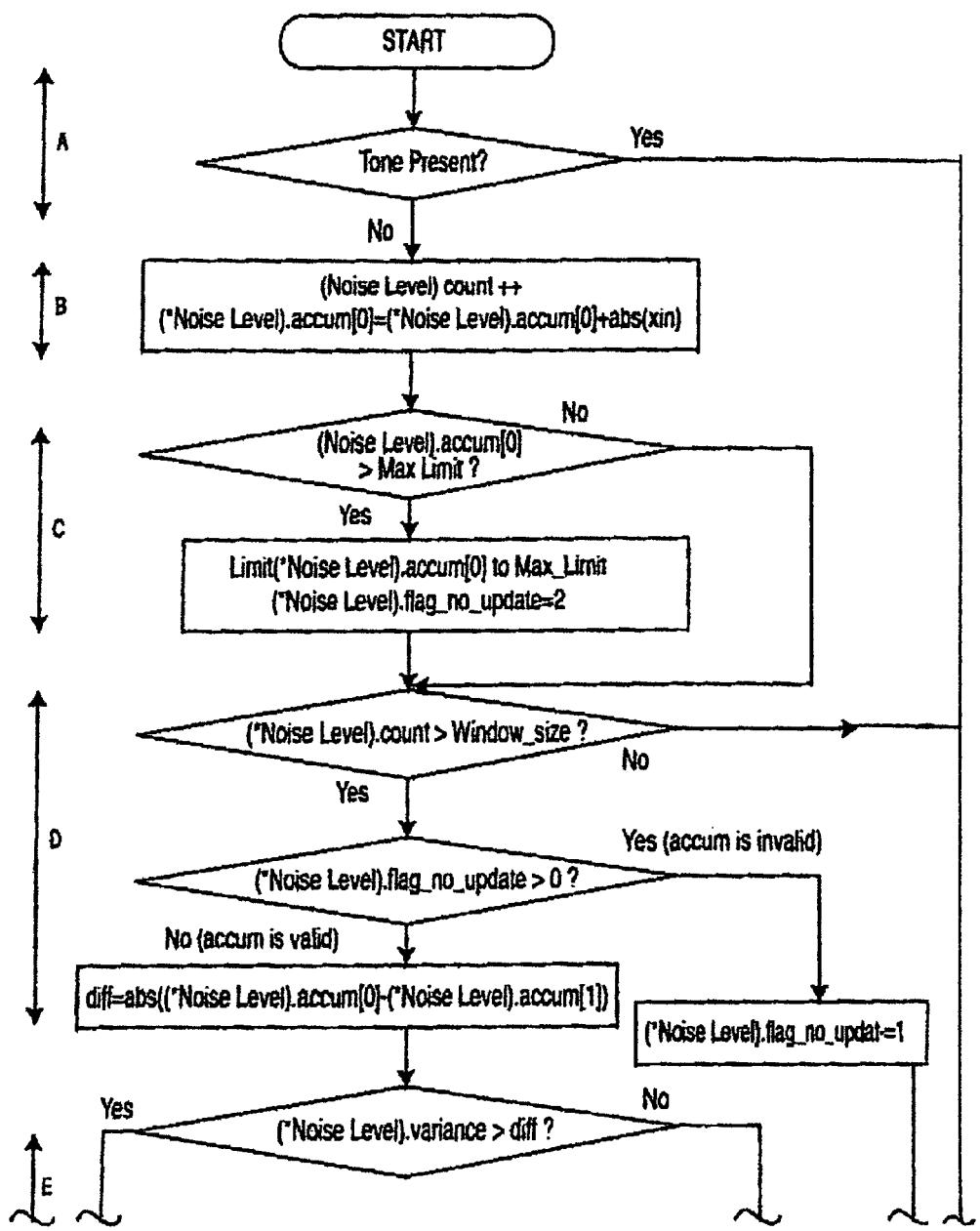

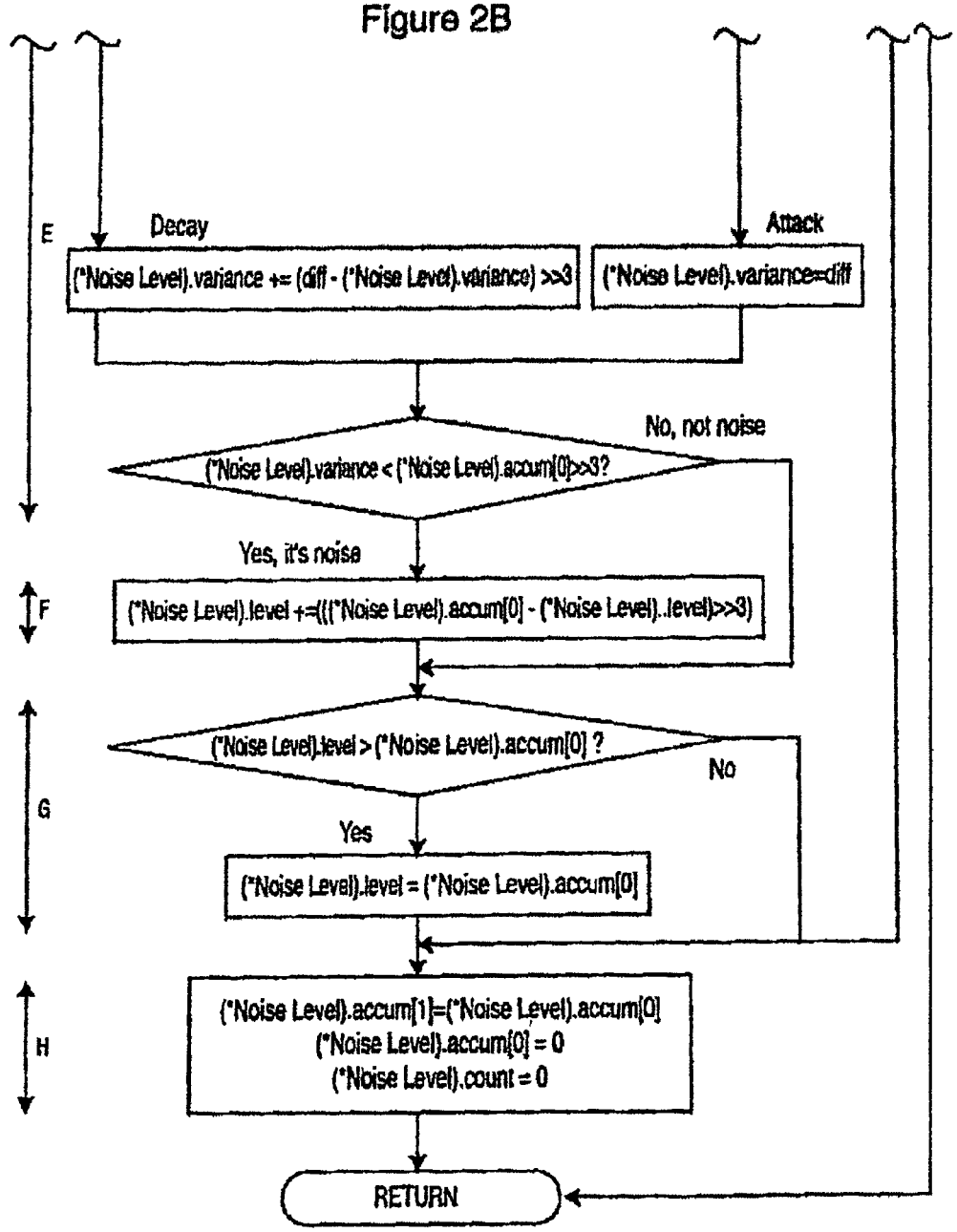

NOISE LEVEL CALCULATOR FOR ECHO CANCELLER

FIELD OF THE INVENTION

The present invention relates generally to telecommunications systems, and in particular to a noise level calculator for detecting noise in a telephone line echo canceller.

BACKGROUND OF THE INVENTION

It is known in the design of line echo cancellers which utilize adaptive filters to incorporate a non-linear processor (NLP) for removal of residual echo signals (e.g. due to non-linearity, distortion, or added signal noise). In order to avoid noise switching being heard on the far end side, it is important that the noise level of the signal applied to the NLP be calculated to distinguish between noise and residual echo.

Noise level calculation is also useful in determining if the reference signal applied to the adaptive filter is noise or a non-noise segment. If noise is detected, then updating of the filter coefficients may be suppressed.

SUMMARY OF THE INVENTION

According to the present invention, a noise level calculator is provided for monitoring the noise level of the error signal applied to the NLP and the noise level of the reference signal applied to the adaptive filter, in order to accomplish the objects set forth above. In contrast with prior art noise detectors which track not only the noise segments but also the signal level and conclude that the noise level is directly proportional to the lowest accumulated signal energy, the noise level calculator of the present invention uses the variance in the signal energy to determine background noise level. Consequently, the noise level calculator of the present invention actually locates the noise periods and adapts to changes in the variance of noise energy during these periods.

BRIEF DESCRIPTION OF THE DRAWINGS

A preferred embodiment of the present invention will now be described in greater detail with reference to the following drawings, in which:

FIG. 2 is a flowchart showing steps for implementing the noise level calculator according to the preferred embodiment.

DETAILED DESCRIPTION OF THE PREFERRED EMBODIMENT

Figure 1:
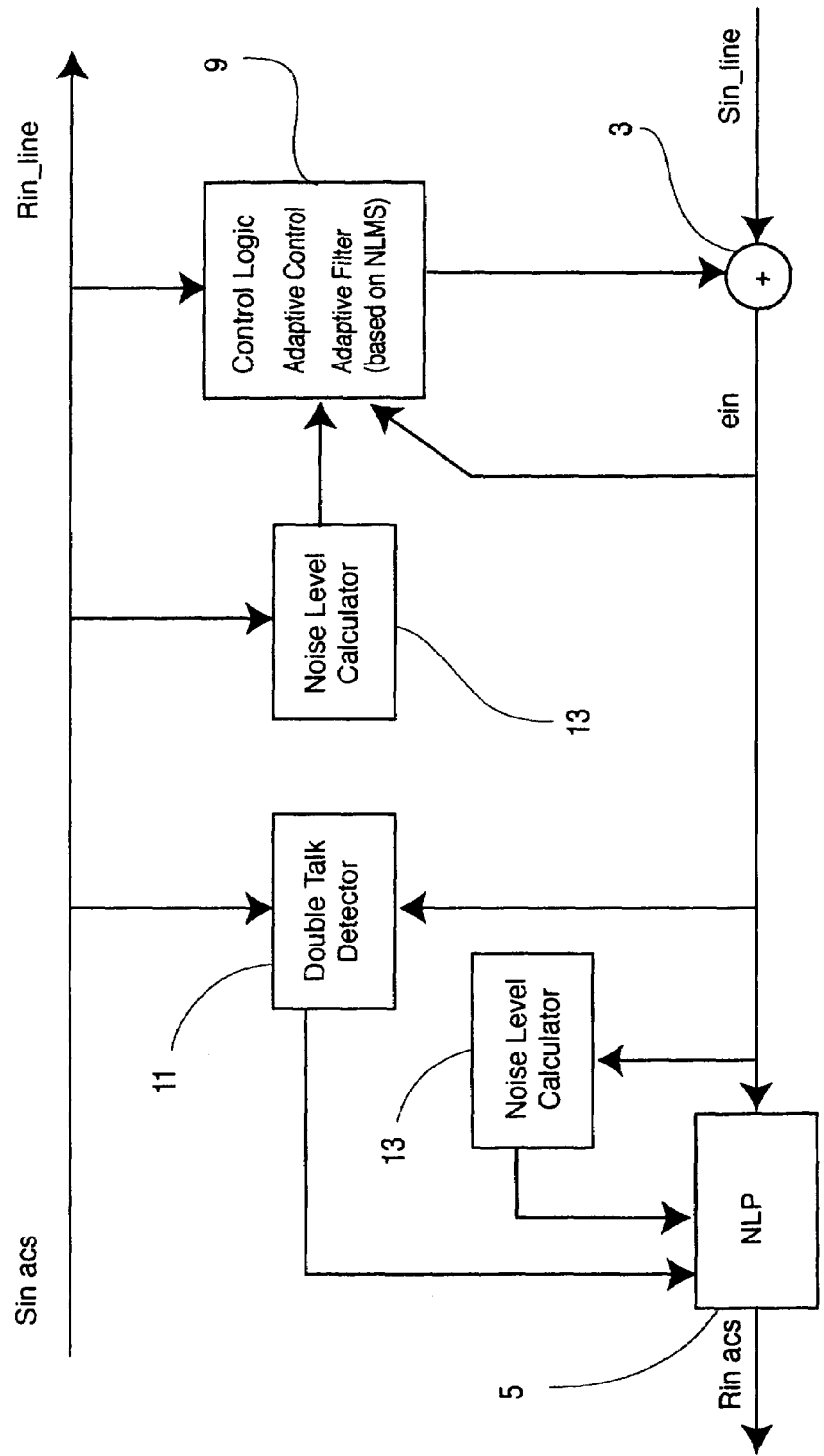
FIG. 1 is a block diagram of a line echo canceller employing the noise level calculator of the present invention.

With reference to FIG. 1, a Line Echo Canceller (LEC) is shown for canceling echo signals from a line echo path (between Sin-line and Rin_line). An adaptive filter algorithm (typically the well known adaptive LMS algorithm) is implemented within control logic block 9 to perform the echo cancellation function. The adaptive filter output is subtracted within summation block 3 from the input line signal (Sin-line) to create an error signal (ein). As discussed above, NLP 5 is provided for removal of residual echo signals due to non-linearity, distortion, added signal noise, etc. A double talk detector 11 is included for disabling the NLP 5 during a double talk condition (i.e. when the near-end party begins talking, in which case the signal becomes near-end speech plus far-end echo).

According to the present invention, a noise level calculator 13 is provided for continually monitoring the noise level for the error signal ein as well as for the reference signal Rin-line. The noise level of the error signal is used by the NLP component 5 to decide if the sample is noise or residual echo. If noise is detected, it is transmitted as is but if residual echo is detected, the NLP 5 generates a noise sample. The noise level of the reference signal is used by the adaptive filter algorithm in control block 9 to decide if the signal is speech or noise. If it is noise, the echo canceller coefficients are not updated.

Turning now to FIG. 2, a preferred algorithm is shown for implementing the noise level calculator of the present invention. The equations in FIG. 2 are written for optimal performance in a C compiler. Two inputs are required for the implementation, namely an input signal, xin and a tone decision parameter, tone_decision. The internal state of the noise level calculator and its local variables is held in a local workspace, (i.e. the noise level structure set forth below).

The same function is used to calculate the noise level for the reference signal, Rin_line, and the error signal, ein, of the LEC in FIG. 1 The input sample, xin, for each noise calculator implementation is chosen to be either ein or Rin_line.

The Noise Level Structure and the required local variables for each such implementation are as follows, with reference to FIG. 2:

Structure (*NoiseLevel):
(*NoiseLevel).count: this is a counter for the sample window
(*NoiseLevel).level: this represents the NoiseLevel
(*NoiseLevel).accum[0]: current accumulation of the input signal
(*NoiseLevel).accum[1]: previous accumulation of the input signal
(*NoiseLevel).variance: variance of the accumulation
(*NoiseLevel).flag_no_update: invalid window flag, Noise Level is not updated
xin: input sample
diff: difference between the previous and current accumulations
tone_decision: flag is 1 if signal is a Tone
nlevel_count: number of accumulations before the Noise Level is updated The algorithm of the present invention is based on the assumption that the energy variance of a noise segment is much lower than the energy variance of a voice segment. After determining that no tone is present (step A), samples within a window of 256 samples (32 msec) are accumulated (i.e. the signal energy within the window is calculated). ((*NoiseLevel).accum[0]=(*NoiseLevel).accum[0]+abs (xin) in step B). When the window is completed ((NoiseLevel.count>Window_size? in step D), the noise level is updated and the result is saved in memory. It is important that the sample accumulation does not exceed a maximum level (limit (*NoiseLevel).accum[0] to Max_limit, in step C) in order to ensure that the variance and noise level calculations do not become corrupted. In the event that the accumulation is invalid (Yes(accum is invalid), in step D), the Noise Level is not evaluated for the next two windows (as a result of the flag being set at (*NoiseLevel). flag_no_update=2 in step C and then twice decremented (*NoiseLevel.flag_no_update-=1 in step D). Two windows are considered invalid at start up as well as when the Max-limit has been reached. They are not used, so as to fill in or clear the history of accumulations respectively.

When two valid accumulations of samples are available, the difference is calculated, which is then used to update the variance of these accumulations as a weighted average of the difference and the previous values of the variance parameter (i.e. (*NoiseLevel).variance+=(diff−(*NoiseLevel.variance)>>3) adjusts the variance parameter to the existing (i.e. previous) variance parameter plus a multiple (÷8) of the difference (diff) minus of the previous variance parameter, and (*NoiseLevel.variance=diff) adjusts the variance parameter to the previous variance parameter. Thus, in the embodiment of FIG. 2, the variance is calculated/updated with an attack ratio of 1 and a decay ratio of 8 (i.e. >>3 in step E). These attack and decay rates were chosen empirically so that the noise level is not updated during short periods of low energy (e.g. caused by fricatives in a voice segment). Alternatively, other attack and decay ratios may be chosen to suit different applications. Consequently, the attack rate is aggressive and the decay rate is slower than the attack rate.

When the variance decreases to the accumulation level divided by a predetermined scale factor ((*NoiseLevel).variance<(*NoiseLevel).accum[0]>>3? in step E), the current accumulation is considered to be part of a noise segment. This factor (>>3=8 in Step E) was chosen after comparing the ratio between different noise levels and corresponding variances of the accumulations. When it is decided that the accumulation is noise (step F), the noise level is calculated/updated with a decay ratio of 8 (i.e. >>3 in Step F). A decay ratio other than 8 may be chosen for different applications.

In the case where the noise level is greater than the accumulation, the noise level is reset to the current accumulation value (step G). This is to ensure that the noise level calculator is biased towards the lowest possible noise level.

Finally, some variables are re-initialized for the next accumulation window (step H).

It should be noted that, for the ein signal, the noise level is multiplied by a factor of 0.013 (which is 3.3/256, 256 being the Window size) before it is compared to an actual sample. For the Rin_line signal, the noise level is multiplied by a factor of 0.2 (50/256) which is on the high side for the noise threshold.

Alternatives and variations of the invention are possible. For example, real energy calculations can be used instead of taking the absolute value of the samples in step B, different window sizes may be used, and different attack and decay rates may be specified for updating the variance (step E). Furthermore, it is contemplated that the algorithm of the present invention may also be applied to detect voice (i.e. the absence of noise) and may be applied to the operation of a comfort noise generator for silence suppression. All such alternative embodiments and applications are believed to be within the sphere and scope of the invention as defined by the claims appended hereto.

I claim:

1. A method of calculating noise level in a signal, comprising the steps of:

accumulating two sample windows of said signal;

calculating energy of said signal between each of said sample windows;

calculating the difference in said energy of said signal within each of said sample windows;

updating a variance parameter based on said difference;

in the event that said variance parameter is less than a predetermined multiple of the energy of said signal within a most recent one of said sample windows then indicating the presence of noise and setting a noise level parameter as a function of the energy of said signal within said most recent one of said sample windows, and in the event that said variance parameter is greater than or equal to said predetermined multiple of the energy of said signal within said most recent one of said sample windows then indicating the absence of noise in said most recent sample window; and in the event that said noise level parameter exceeds the energy of said signal within said most recent one of said sample widows then setting said noise level parameter to equal the energy of said signal within said most recent one of said sample windows, wherein said step of updating said variance parameter further comprises the steps of:

comparing said variance parameter to said difference in said energy of said signal within each of said sample windows and setting said variance parameter to the weighted average of the difference and a previous value of the variance parameter; and in the event that said variance parameter is greater than said difference then adjusting said variance parameter with a predetermined decay ratio, and in the event that said variance parameter is less than or equal to said difference then adjusting said variance parameter with a predetermined attack ratio.

2. The method of claim 1, further comprising the steps of discarding two successive ones of said sample windows at start up and for each subsequent first one of said two successive sample windows which exceeds a predetermined maximum energy.

3. The method of claim 1, wherein said step of setting the noise level parameter as a function of the energy of said signal within said most recent one of said sample windows further comprises setting said noise level parameter to the weighted average of the energy of said signal within said most recent one of said sample windows and a previous value of said noise level parameter.

* * * * *